United States Patent [19]
Lee

[11] Patent Number: 5,316,061
[45] Date of Patent: May 31, 1994

[54] SHIMS FOR DADO CUTTER SET

[76] Inventor: Leonard G. Lee, 517 Westminster Ave., Ottawa, Ontario, Canada, K2A 2T9

[21] Appl. No.: 31,607

[22] Filed: Mar. 16, 1993

[51] Int. Cl.⁵ .......................... B26D 1/12; B27G 13/00; F16B 43/02
[52] U.S. Cl. ...................... 144/218; 83/664; 83/425.3; 144/222; 144/238; 144/239; 411/539
[58] Field of Search ............... 83/425.3, 664; 144/218, 144/222, 236, 237, 238, 239; 411/535, 539, 541

[56] References Cited

U.S. PATENT DOCUMENTS

| | | | |
|---|---|---|---|
| 737,194 | 8/1903 | Armstrong | 83/664 |
| 1,764,950 | 6/1930 | Griner | 411/539 |
| 3,146,010 | 8/1964 | Dellith | 411/539 |
| 3,411,392 | 11/1968 | Spangler | 83/664 |
| 4,502,165 | 3/1985 | Szemeredi et al. | 411/539 |
| 4,589,458 | 5/1986 | McCord, Jr. | 144/238 |
| 5,197,841 | 3/1993 | Tanaka | 477/539 |

FOREIGN PATENT DOCUMENTS

| | | | |
|---|---|---|---|
| 172082 | 6/1906 | Fed. Rep. of Germany | 144/239 |
| 957307 | 5/1964 | United Kingdom | 83/664 |

*Primary Examiner*—W. Donald Bray
*Attorney, Agent, or Firm*—Kilpatrick & Cody

[57] ABSTRACT

Dado shims that are disks of substantially incompressible, flexible, color coded plastic sheet material of uniform predetermined thicknesses having a central arbor hole and a radial slot narrower in width than the arbor hole diameter so that each shim is shaped like the letter "C" and can be distorted slightly during positioning on a saw arbor between dado set blades without removing any of the blades, by slipping the shim over the arbor through the slot until the shim seats on the arbor within the shim arbor hole.

9 Claims, 1 Drawing Sheet

SHIMS FOR DADO CUTTER SET

BACKGROUND OF THE INVENTION

This invention relates to shims for adjusting the combined width of multiple blade dado saw blade sets.

Grooves known as "dados" and similar formations such as rabbets or rebates have long been important in woodworking, particularly in furniture and cabinet construction. A variety of methods have been used for cutting dados and rabbets, including plow planes, chisels, routers and saws. Circular saw dado-cutting devices include multiple blade cutter sets and "wobble" type cutters in which a saw blade having eccentric washers is made to wobble as it rotates so that the resulting saw groove is wider than the blade itself. While the width of the kerf cut by such a "wobble" type dado cutter is infinitely adjustable between the actual width of the blade and the maximum possible wobble, such dado cutters machine a groove with an arcuate bottom and present other drawbacks. Accordingly, multiple-blade dado cutter sets remain popular for use with circular saws. Such sets normally include two relatively conventional circular saw blades and several two or four tooth cutters or blades having substantially the same cutting diameter as the circular saw blades in the set. The two or four tooth blades are stacked between the round blades in a combination that results in the desired combined blade width. Typically, the kerf cut by each blade exceeds the thickness of the same blade in the area of the blade adjacent to the blade arbor hole, by virtue of tooth set, tooth thickness or both. In use, the blades are staggered so that gaps in one blade accommodate the teeth that overhang from an adjacent blade.

As will be appreciated, the nominal widths of cut possible utilizing such a set are multiples of the widths of the blades stacked together at a particular time. Accordingly, in order to adjust the total cutting width by an amount less than the thickness of the thinnest blade associated with such a dado blade set, one or more shims must be used between blades. Paper, pasteboard, adhesive tape, and brass sheet materials of various thicknesses have previously been used for such shims, and they have typically been in the form of a washer, that is a disk with a centrally-located hole slightly larger in diameter than the saw arbor.

While such disks can be successfully used to adjust dado multiple-blade set width, they are inconvenient to use and typically require removal of the saw arbor nut, arbor washer and one or more blades of the dado head set in order to add or remove shims. This frequently must be done several times before a desired cutting width is achieved.

BRIEF DESCRIPTION OF THE INVENTION

The dado shims of the present invention are disks having a centrally located arbor hole and a radial slot narrower in width than the arbor hole diameter, so that each dado shim is shaped like the letter "C." Significantly, the shims of the present invention are formed from substantially incompressible but flexible plastic sheet of various uniform, predetermined thicknesses that are preferably color coded. Use of such plastic material permits each shim to be distorted slightly so that is can be positioned on a saw arbor between dado set blades without removing any of those blades, by slipping the shim over the arbor through the slot until the shim seats on the arbor within the shim arbor hole.

Use of an appropriate plastic material that is oil and grease resistant will make the shims durable, and use of a material that is substantially incompressible will make them accurate. Moreover, use of a plastic material that has sufficient "tooth" discourages the dado set blade members lying on either side of a particular shim from rotating relative to each other as the arbor nut is tightened, so that the dado blade set is easily fixed on the saw arbor with its cutters properly positioned by tightening the arbor nut.

DETAILED DESCRIPTION OF THE INVENTION

Figures 1, 2:
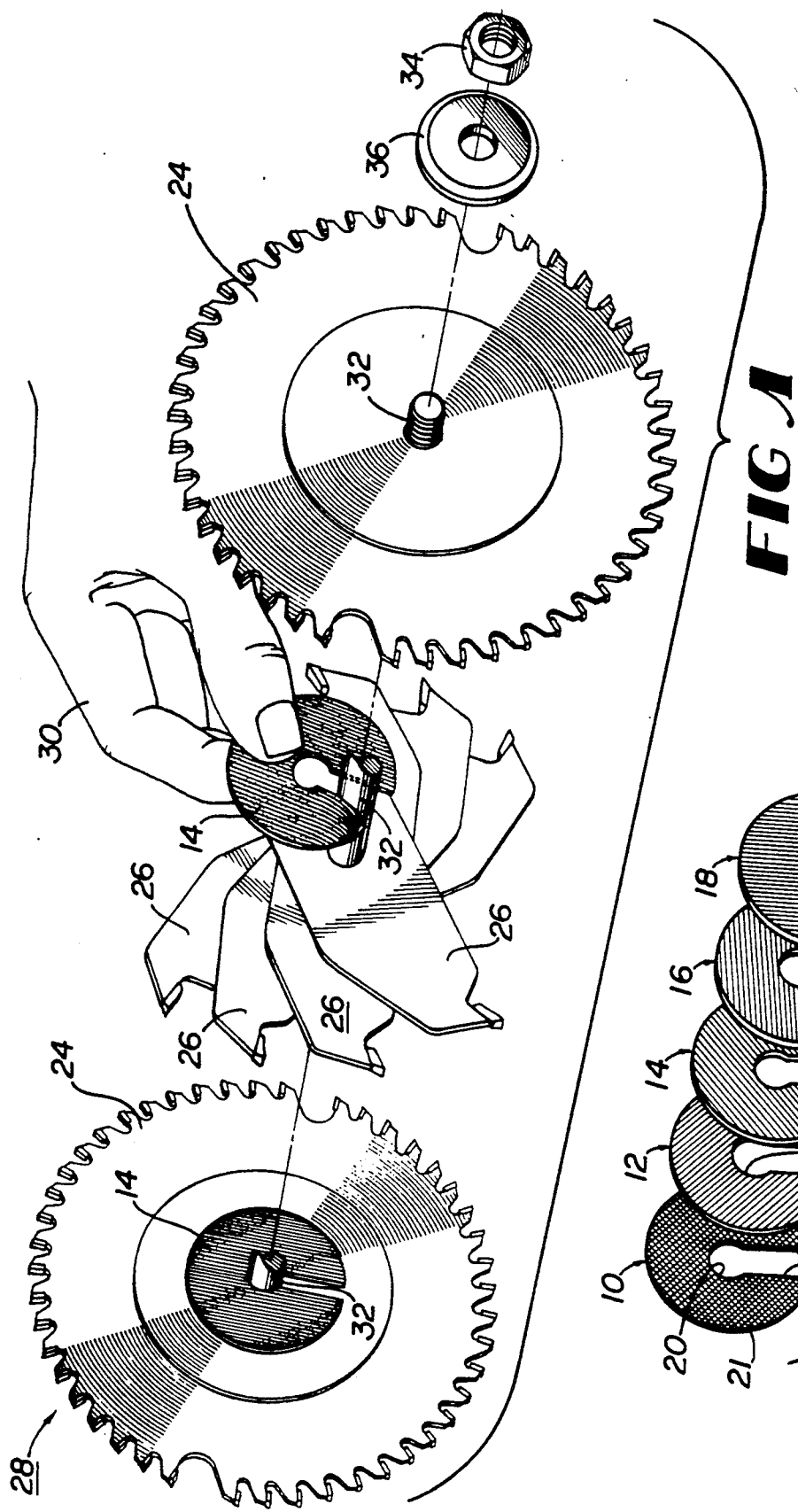
FIG. 1 is an exploded perspective view of one dado shim of the present invention being positioned on a saw arbor on which another such shim and dado blades are already positioned.
FIG. 2 is a perspective view of a set of five dado shims of the present invention having different thicknesses and alternative shapes and in which the shims are lined to indicate color.

Dado shims 10, 12, 14, 16 and 18 of the present invention are illustrated in FIGS. 1 and 2. Each such dado shim is a disk of plastic sheet material of uniform thickness having a centrally located arbor hole 20 that is open to the edge 21 of the disk. Shims 10, 12 and 14 include a radial slot 22 that is slightly narrower in width than the diameter of the arbor hole 20, which slot 22 connects the hole 20 with the disk edge 21. Shims 16 and 18 illustrate alternative embodiments. In shim 16, a radial slit 23 connects arbor hole 20 with disk edge 21. In shim 18, a V-shaped segment of plastic sheet material is omitted from shim 18 so that a V-shaped segment 25 of shim 18 is open between arbor hole 20 and shim edge 21.

A set of dado shims may include any desired number of shims and preferably will include shims having different thicknesses, so that fine and precise adjustments in the total width of the dado set 28 may be easily achieved by selecting and using the appropriate combination of shims.

As is illustrated in FIG. 1, a dado shim 14 may be utilized between each circular blade 24 and the two-tooth blade 26 that is positioned next to it, or between two of the two-tooth blades 26. As is intended to be suggested by the hand 30 shown in FIG. 1, a dado shim 14 may be slipped onto saw arbor 32 by forcing the arbor 32 to slide through slot 22 until the arbor 32 occupies arbor hole 20, which may be easily accomplished since the shim 14 can bend or splay adjacent the slot 22 (or slit 23 in shim 16, or segment 25 in shim 18) to accommodate the diameter of arbor 32.

This is highly advantageous because it permits the dado shims (such as shim 14) of the present invention to be inserted between dado cutters 24 and 26 or removed therefrom without removing any of the cutters 24 and 26 from the saw arbor 32 or removing the arbor nut 34 or washer 36 from arbor 32. This is desirable because it is often relatively difficult to position dado cutters and blades on a saw arbor and remove them quickly, particularly when arbor 32 is part of a table saw having a relatively small opening through which such cutters and blades must be inserted and removed and within which adjustments must be made. Some saw arbor lengths will not permit sufficient separation of dado blades 24 and cutters 26 to position and remove a dado shim 14 with the operator's fingers on hand 30, as illustrated in FIG. 1. The same operation can then be easily accomplished, however, utilizing an appropriate tool such as tweezers or needle nose pliers to grasp the dado shim 14 and position it on or remove it from arbor 32 between closely spaced blades 24 and 26.

By utilizing dado shims in accordance with the present invention, it is easy to adjust a set of blades 24 and cutters 26 to the exact width desired by mounting blades 24 and a sufficient number of cutters 26 on the saw arbor 32 to result (without shims) in a total cutter head 28 width slightly under that desired. Shims may then be inserted as illustrated in FIG. 1 and the arbor nut 34 tightened for the purpose of measuring the resulting width directly or by making a test cut, and such shims 10, 12, 14, 16 or 18 may be removed or others may be easily added as described above merely by loosening the arbor nut 34 but without the requirement that the nut 34, arbor washer 36 or any blades 24 and cutters 26 be removed.

Since shims 10, 12, 14, 16 or 18 of the present invention may be stacked to produce additional blade separation, it is possible to enjoy the benefits of the present invention by utilizing shims of a single appropriately small thickness. Easier adjustment of dado set 28 thickness and more exact adjustment of that thickness can be achieved, however, if a set of shims is utilized that includes shims have differing thicknesses, such as the differing thicknesses illustrated in shims 10, 12, 14, 16 and 18 in FIG. 2. By choosing plastic materials for making such shims of different colors that correspond to different shim thicknesses, the shim color may act as an indicator of thickness, making it easy to select a shim having a desired thickness without measuring or carefully inspecting the shim.

While a variety of plastic materials providing the properties described above may be utilized to manufacture shims in accordance with the present invention, preferable materials include polyvinyl chloride ("PVC") and similar acetate films. Shims having the shapes described above may also be fabricated from appropriate metal or pasteboard stock, but such metal or pasteboard shims will not provide all of the advantages associated with the plastic shims described herein.

The appropriate dimensions of shims 10-18 of the present invention will depend on the diameters of the dado blades 24 and cutters 26 and the saw arbor involved and can vary widely. It is important that the slot 22, slit 21, segment 23 or other opening in each dado shim 10, 12, 14, 16 and 18 have a width adjacent to arbor hole 20 less than the diameter of saw arbor 32 so that the shim will not fall off of the arbor, and it is important for the shims to be sufficiently large to provide a substantial bearing surface between the shim and adjacent dado set blades or cutters. Accordingly, appropriate dimensions for dado shims 10, 12 and 14 for use with a dado cutter set 28 having blades 24 eight inches in diameter for use on a ⅝ inch diameter saw arbor are a total dado shim diameter of two and one-half (2½) inches, an arbor hole 20 diameter of 0.630 to 0.640 inches and a slot 22 width of three-eights (⅜) inch. Appropriate thicknesses are 0.002 inches for dado shim 10, 0.005 inches for dado shim 12, 0.010 inches for dado shim 14 and 0.020 inches for dado shim 16, but a variety of other thicknesses can, of course, be used.

The foregoing description of this invention is for purposes of explanation and illustration. It will be apparent to those skilled in the art that modification and changes may be made to this invention as thus described without departing from its scope and spirit.

I claim:

1. A dado shim for spacing two components of a dado blade set positioned on an arbor comprising a disk of uniform thickness, oil and grease resistant, substantially incompressible, flexible plastic sheet material having sufficient tooth to resist rotation of the dado blade set components separated by the shim as such components are fixed on the arbor and having a perimeter, a centered, round arbor hole and a radial slot between the arbor hole and the disk perimeter, which slot is smaller in width adjacent to the arbor hole than the arbor hole diameter.

2. A dado shim for spacing two components of a dado blade set positioned on an arbor comprising a disk of uniform thickness, oil and grease resistant, substantially incompressible, flexible plastic sheet material having sufficient tooth to resist rotation of the two dado blade set components separated by the shim as such components are fixed on the arbor and having a perimeter, a centered arbor hole and a radial slit between the arbor hole and the perimeter of the disk.

3. A set of dado shims for spacing two or more components of a dado blade set positioned on an arbor, comprising at least two disks, each of which disk:
   (a) is formed of uniform thickness, oil and grease resistant, substantially incompressible polyvinylchloride, flexible plastic sheet material having sufficient tooth to resist rotation of components of the dado blade set separated by one of the shims as such components are fixed on the arbor,
   (b) is of different thickness and
   (c) has a perimeter, a centered, round arbor hole and a radial slot between the arbor hole and the disk perimeter, which slot is smaller in width adjacent to the arbor hole than the arbor hole diameter.

4. The set of dado shims of claim 3, wherein each shim of a particular thickness is of a particular color that is different from the color of shims of a different thickness.

5. The dado shim of claim 1, wherein the plastic sheet material is polyvinylchloride.

6. The dado shim of claim 2, wherein the plastic sheet material is polyvinylchloride.

7. A dado cutter set comprising:
   (a) two circular dado saw blades;
   (b) a plurality of dado cutters;
   (c) a plurality of dado shims, each comprising a disk of uniform-thickness, oil and grease resistant, substantially incompressible, flexible plastic sheet having sufficient tooth to resist rotation of the blades and cutters separated by one of the shims as such blades and cutters are fixed on the arbor and having a perimeter, a centered arbor hole and a radial slot between the arbor hole and the disk perimeter, which slot is smaller in width adjacent to the arbor hole than the diameter of the arbor hole.

8. The dado shim of claim 7, wherein the plastic sheet material is polyvinylchloride.

9. A set of dado shims for spacing two or more components of a dado blade set positioned on an arbor, comprising at a plurality of disks, each of which disk:
   (a) is formed of uniform thickness, oil and grease resistant, substantially incompressible, flexible polyvinylchloride plastic sheet material having sufficient tooth to resist rotation of components of the dado blade set separated by one of the shims as such components are fixed on the arbor, (b) is substantially 0.002 inch, 0.005 inch, 0.010 inch, or 0.020 inch thick and substantially 2.5 inches in diameter and (c) has a perimeter, a centered, round arbor hole approximately 0.630 inch to 0.640 inch in diameter and a radial slot between the arbor hole and the disk perimeter, which slot is approximately 0.380 inches in width adjacent to the arbor hole.

* * * * *